UNITED STATES PATENT OFFICE.

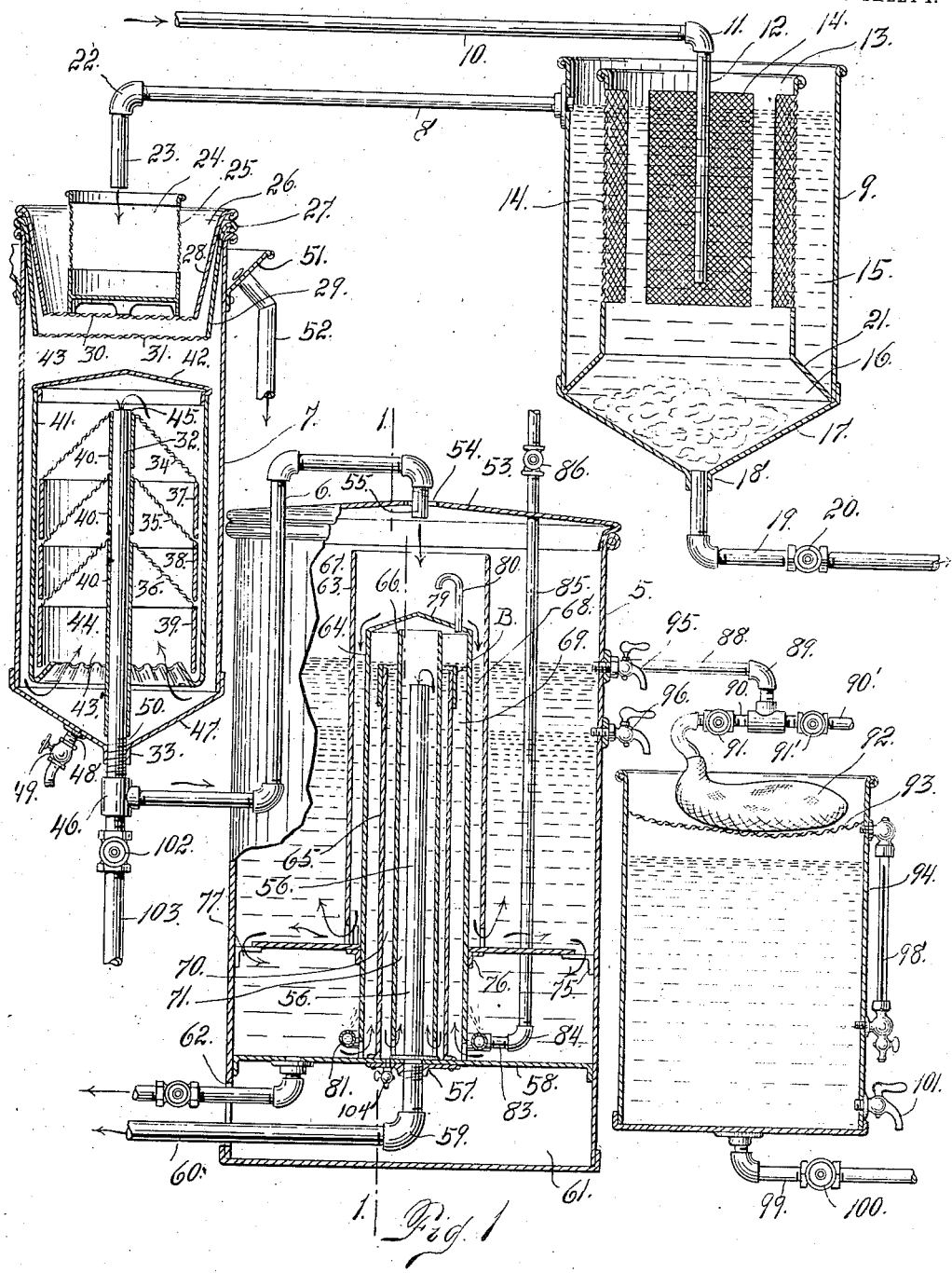

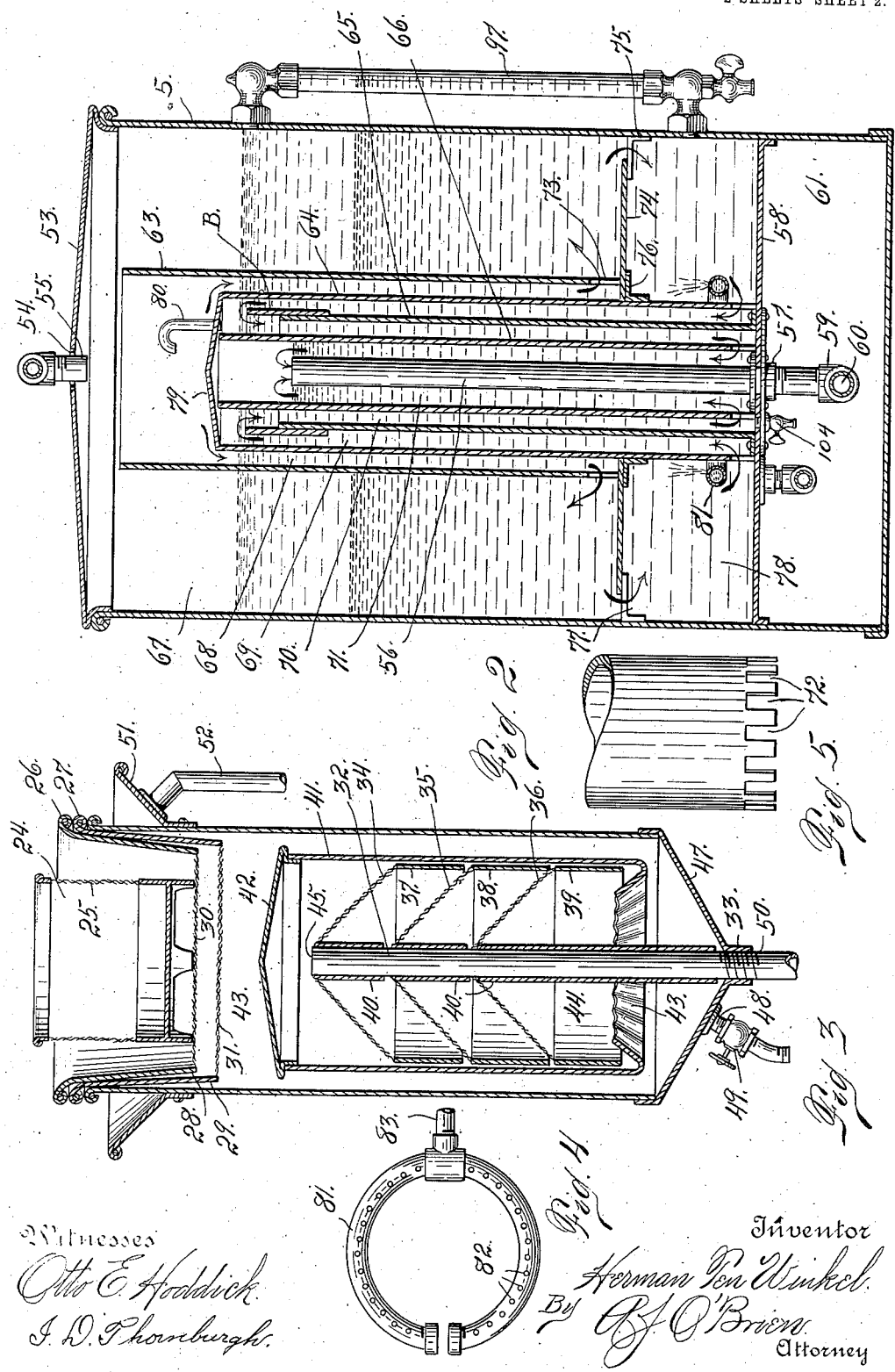

HERMAN TEN WINKEL, OF DENVER, COLORADO.

OIL SEPARATOR AND PURIFIER.

985,961.  Specification of Letters Patent.  Patented Mar. 7, 1911.

Application filed January 4, 1910. Serial No. 536,435.

*To all whom it may concern:*

Be it known that I, HERMAN TEN WINKEL, a citizen of the United States, residing in the city and county of Denver and State of Colorado, have invented certain new and useful Improvements in Oil Separators and Purifiers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful Improvements in oil separators and purifiers of which the following is a specification.

The object of the invention is to provide a device by means of which oil may be separated from the steam condensation of a steam plant, or from other fluids with more efficient results than heretofore employed for that purpose.

My invention embodies certain improvements in my United States Patents Numbers 612,791 Oct. 18, 1898; and 665,841 Jan. 8, 1901, and consists essentially in the provision of a number of primary filtering tanks in communication with a main filtering tank, and a storage tank for the oil after having passed through the filtering tanks and freed of all foreign substances. These filtering tanks are provided with means whereby the steam condensation, in its hot state is first cooled and freed of all foreign substances in passing through the primary filtering tanks, and then separated from the water in the main tank. Owing to the greater specific gravity of the water, the oil rises to the surface of the water in the main tank, and overflows through a pipe into the storage tank. The water passes out through a discharge pipe of the main tank, from whence it is conveyed in a purified state so that it may be used for boiler purposes. I also provide within the main tank means for maintaining a predetermined amount of oil on the surface of the water at all times, and allowing all surplus oil to overflow.

Having thus described my invention in brief, the same may be more fully understood by referring to the accompanying drawing described in the following specification, in which the same reference characters indicate the same parts in all the views.

Figure 1 is a vertical and central broken section taken through the entire apparatus. Fig. 2 is a vertical section of the main tank on the line 1—1 of Fig. 1. Fig. 3 is a vertical section of one of the primary filtering tanks. Fig. 4 is a top plan view of a water discharge nozzle which is positioned within the main tank. Fig. 5 is a side elevation of concentric partitions surrounding the discharge pipe of the main tank.

Referring to the drawings in detail. Let the numeral 5 designate the main tank having a supply pipe 6 connected with the top of the tank, and leading from the primary filtering tank 7, which is positioned adjacent the main tank. The tank is in communication through the medium of a pipe 8 with a second primary filtering tank 9. The tank 9 is provided with a pipe 10 having an elbow 11, and a discharge portion 12 which extends into the tank 9, and centrally supported within a chamber 13 having screen walls 14, which perform the initial step in separating the foreign substances from the condensation of the steam of an engine plant. The condensed steam passes through the screen walls 14 into a chamber 15, and the foreign substances are deposited into the bottom portion 16 of the chamber 13. This bottom portion 16 of the chamber 13 has its walls 17 tapering to a discharge opening 18 which communicates with a pipe 19 provided with a stop valve 20. Through this pipe 19 the foreign substances deposited in the lower portion 16 of the chamber 13 may be drawn off. The chamber 13 is circular in form and has its base 21 tapering to the outer walls of the tank 9 and forms a partition between the chambers 13 and 14. The exhaust passes through the screens 14 from the chamber 13 into the chamber 15 and overflows through the pipe 8 which is provided with an elbow 22 and supports a discharge nozzle above the second primary filtering tank 7. The tank 7 is provided with a receptacle 24 positioned at a point under the nozzle 23 of the pipe 8. This receptacle 24 is provided with a screen wall 25 forming the upper portion of the receptacle. The condensed steam, as it is discharged into this receptacle, overflows through the screen walls into a strainer 26 which is positioned in a second strainer 27. Any foreign substances which escape with the exhaust through the pipe 8 from the tank 9 are collected in the bottom of the receptacle 24 and strainers 26 and 27. The strainers 26 and 27 have tapering walls 28 and 29 and are provided at their bottom with screens 30 and 31. A vertically arranged pipe 32 extends from a point within the receptacle 7 through an opening 33 in the bottom of the tank and communicates through the pipe 6 with the main tank 5. This pipe 32, on the portion within the tank 7, carries a plurality of conical shaped strainers 34, 35 and 36 which are provided with depending circumferential walls 37, 38 and 39. These conical strainers are also provided with sleeves 40, which are slidably mounted upon the pipe 32. Surrounding these conical strainers, carried by the pipe 32, is a circumferential partition 41 provided with a diaphragm 42 which fits over the top of the circumferential partition 41. The lower portion of the partition has its edges turned upwardly, and forms a tapering opening into the chamber 44.

The condensed steam passes through the screens 30 and 31, into a chamber 43, flows over the diaphragm 42, between the partition 41 and the wall of the chamber 7, and enters an opening 43′ in the bottom of the partition 41 and into the chamber 44 formed by the said partition, thence through the conical strainers which are inclosed within the chamber 44, and overflows through an opening 45 in the top of the pipe 32 which is connected with the pipe 6 at a joint 46.

The bottom 47 of the tank 7 tapers toward the pipe 32, from the side wall of the tank and is provided with a discharge nozzle 48 having a stop valve 49 through which the tank may be thoroughly drained of any sediment contained therein. This bottom portion 47 of the tank is threaded on the pipe 32 as indicated by the numeral 50. The upper portion of the tank 7 is provided with a circumferential overflow trough 51 having a discharge pipe 52. This trough 51 is arranged to catch the fluid in case the tank 7 overflows. From this trough the fluid is conveyed through the pipe 52 to any desired place, (not shown).

The main tank 5, in which the fluid containing oil receives its final step of separation, is so arranged that water, owing to its specific gravity, will sink to the bottom of the tank, while the oil will float on top of the water. This tank is provided with a removable cover 53, having a central opening 54 through which a discharge nozzle 55 of the pipe 6 depends. This tank is provided with a central and vertically arranged pipe 56 which extends from a predetermined point within the tank through an opening 57 in a bottom partition 58 of the tank and is connected by means of an elbow 59 with a pipe 60 which extends through the chamber 61, and through an opening 62 formed in the side of the tank 5. The purified water is conveyed through the pipe 60 to a hot well, (not shown) and may be used for boiler purposes. Surrounding the pipe 56 is positioned a number of concentric partitions or tubes 63, 64, 65 and 66, and dividing the space between the concentric partitions and the wall of the tank into a number of distinct compartments 67, 68, 69, 70 and 71. Every alternating tube or partition, beginning with the outermost, is provided with openings 72 at the bottom, as shown in Fig. 5. The upper extremity of the outer tube of each compartment extends above the top of the adjacent inner tube, whereby every alternate compartment is provided with an inlet at the bottom and an overflow at the top, with the exception of the outer compartment 68, which is provided with an outlet at the bottom, as shown at 73, and indicated by the arrows in Figs. 1 and 2. The partition 63 which forms the compartment 68 is seated on a partition 74, and extends above the top of the remaining compartments, nearly to the top of the tank. The partition 74 rests upon angle irons 75 and 76 which are secured to the inner walls of the tank 5 and the partition 64, respectively. Near the outer edge of this partition is formed openings 77 which communicate with a compartment 78 formed in the lower portion of the tank by the partition 74. The remaining partitions 64, 65 and 66 extend below the partition 74 and rest upon the partition 58. The partition 65 is provided with a collar B adjustably mounted upon the upper extremity. This collar is adapted to be adjusted on the partition 66 for the purpose of maintaining a predetermined amount of oil on the surface of the water at all times, and to regulate the level of the water relative to the amount of oil contained in the tank. By adjusting the collar B downwardly the level of the water is lowered and causes a greater amount of oil to be contained on the surface of water between the overflow pipe 88 and the level of the water. In a similar manner by adjusting the collar upward the level of the water will be raised and a less amount of oil maintained within the tank. The partition 64 is provided with a diaphragm 79 closing the top of the said partition, and having an orifice 80, through which the air within the compartments 69, 70 and 71 may escape, thereby exhausting any pressure within these compartments, so that the water will flow into the compartments through the openings 72. The lower portion of the compartments just above the openings 72 within the chamber 78 is provided with a circular water discharge nozzle 81, having perforations 82. This nozzle is in communication with a supply pipe 85 through a short pipe 83, and a connecting elbow 84. The supply pipe 85 is provided with a valve 86 for regulating the flow of water through the said pipe. The water discharge nozzle is arranged to supply cold water within the chamber 78, for the purpose of chilling the fluid and to accomplish a thorough separation of any oil from the fluid, which may have escaped with the fluid through the opening 77. By this means the fluid contained in the tank may be chilled to any desired temperature, which is accomplished by regulating the volume of cold water flowing through the nozzle by means of the stop valve 86. The condensed steam as it enters this main tank 5 from the primary filtering tanks 7 and 9 through the pipe 6 and discharge nozzle 55, falls upon the diaphragm 79, flows over the top thereof and through the compartment 68, through the opening 73 in the bottom of said compartment, into a chamber 67 formed between the partition 63 and the walls of the tank 5. The water, owing to its greater specific gravity, flows downwardly through the openings 77 into the chamber 78, from whence it flows alternately through the chambers 69, 70 and 71 and finally through the pipe 56, which is inclosed within the chamber 70, and extends to a predetermined point from the top of the said chamber.

The oil will rise to the surface of the water contained within the tank 5, from whence it will overflow through a pipe 88 provided with an elbow 89 connecting pipes 90 and 90'. The pipes 90 and 90' are provided with stop valves 91 and 91'. These pipes 90 and 90' communicate with a filtering medium 92 supported upon a screen 93 contained within the top of an oil storage receptacle 94. These two stop valves in the pipes 90 and 90' are for the purpose of providing means whereby the filtering medium may be removed and a new one attached, while the oil is still flowing from the tank and without interruption to the filtering process. This is accomplished by first attaching the new filtering medium to the end of the pipe 90' and opening the valve 91' and closing the valve 91; whereby the oil is directed through the pipe 91' into the new filtering medium. The old filtering medium may then be removed.

The tank 5 is further provided with cocks 95 and 96, through which the oil may be drawn off below the pipe 88 into the storage tank 94. The tank 5 is also provided with a glass gage 97 (as shown in Fig. 2) by which the level of the water and oil within the tank may be determined. The storage tank 94 is also provided with a glass gage 98 for determining the level of the oil contained within this tank. A discharge pipe 99 is connected with the bottom of the tank 94, the said pipe 99 having a stop valve 100. A cock 101 is provided on the side of this tank for drawing oil therefrom.

The operation of the device is substantially as follows: By connecting the pipe 10 with the steam condensation of an engine plant, the condensed steam will flow through the said pipe into the primary filtering chamber 9, through the screen walls of the compartment 14, into the compartment 15, the foreign substances being deposited in the bottom portion of the chamber 13 and the hot condensed steam passing through the screens into the compartment 15 and flows through the pipe 8, discharge nozzle 23 and into the receptacle 24. The receptacle 24 is provided with a cup having extended screen walls 25. Sediment which passes through the screens 14 of the compartment 13 will be further collected within this cup. The condensed steam, still in its hot state, passes through the screen walls 25, strainers 26 and 27, over the diaphragm 42 and flows upwardly through the conical screens 34, 35 and 36 until reaching the level of the discharge opening 45 of the pipe 32. Through the pipe 32 it flows through the pipe 6 into the main filtering tank 5, wherein it flows over the diaphragm 79 of the partition 64 through the chamber 68, openings 73 in the bottom of the said chamber, and into the chamber 78. The final separation of the oil from the exhaust takes place in the chamber 78, the oil rising to the surface of the water, from whence it is drawn out through the pipe 88, filtering medium 92 and into the storage tank 94. The water passes into the chamber 78 through the openings 77 from whence it flows alternately through the chambers 69, 70 and 71 and thence through the discharge pipe 56, to be conveyed to a hot well.

Attention is called to the fact that by the time the condensed steam has passed through the primary filtering tanks into the main filtering tank, it is in a cooled state, rendering the separation more efficient.

The pipe 32 in the filtering tank 7 is provided at its lower extremity with a stop valve 102, which may be opened to allow the condensed steam to pass out through the extension of the pipe 103.

The chamber 70 in the main filtering tank is provided with a pet valve 104, by means of which the chamber may be thoroughly drained of all fluid and sediment which collects therein.

Having thus fully described my invention, what I claim is:

1. An oil separating and purifying apparatus adapted to receive the drips from an engine plant, comprising a plurality of filtering tanks in communication through the medium of each other with a main filtering tank consisting of a number of chambers in which the final step in the separation of the oil from the exhaust takes place, one of the intermediate chambers having means connected therewith for regulating the level of the fluid within the tank.

2. An oil separator and purifier, comprising a plurality of primary filtering tanks, the said tanks being in communication with a main filtering tank consisting of a plurality of vertically disposed chambers in which the final separation of the oil takes place, one of the said chambers being provided with a diaphragm closing the top, the said diaphragm having an air exhaust orifice, means connected with an intermediate chamber for regulating the level of the fluid within the tank, and an overflow pipe for conveying the oil from the tank, substantially as described.

3. An oil separator and purifier comprising a plurality of primary filtering tanks in communication with a main filtering tank consisting of a plurality of vertically disposed chambers in which the final separation of the fluid takes place, means mounted on one of said chambers for maintaining a predetermined amount of oil on the surface of the fluid at all times and for regulating the water level respective to the amount of oil contained thereon, substantially as described.

4. An oil separator and purifier comprising a plurality of filtering tanks in communication with a main filtering tank in which the final separation of the fluid takes place, the said main filtering tank having a plurality of longitudinally disposed chambers and a water discharge nozzle supported within the tank and encircling said chambers at the bottom of the tank, as means of regulating the temperature of the fluid contained therein, substantially as described.

5. An oil separator and purifier comprising a plurality of primary filtering tanks, the said tanks being in communication with a main filtering tank, the main filtering tank consisting of a plurality of vertically and horizontally disposed partitions dividing the same into a number of distinct chambers, in which the final separation of the oil from the condensed steam takes place, the vertically arranged chambers being provided alternately with openings in the bottom, and an overflow at the top, whereby the fluid circulates through the said chambers, a valve connected with the said chambers for draining the chambers, and a water discharge nozzle encircling the said chambers, as means of regulating the temperature of the water within the tank, substantially as described.

6. An oil separator and purifier comprising a plurality of primary filtering tanks in communication with a main filtering tank in which the final separation of the fluid takes place, the said main filtering tank having a plurality of longitudinally disposed chambers, and a cold water discharge nozzle encircling the base of the said chambers at the bottom of the tank, as means of regulating the temperature of the fluid contained therein, substantially as described.

7. An oil separator and purifier, comprising a plurality of filtering tanks in communication with each other, a main tank consisting of a plurality of vertically disposed chambers in which the final separation of the oil takes place, means mounted on an intermediate chamber for regulating the level of the fluid within the tank, a storage tank communicating with the main tank and adapted to receive oil from a predetermined level, within the main tank, and filtering media through which the oil is conveyed to the storage tank.

8. An oil separator comprising a tank having a number of chambers in which the separation of the oil takes place, and a collar on one of the said chambers adjustable for maintaining a predetermined amount of oil on the surface of the fluid at all times and for regulating the water level respectively to the amount of oil contained thereon.

9. An oil separator comprising a tank in which the separation of the oil takes place, the said tank having a vertically disposed chamber and means for adjusting the height of the said chamber for regulating the water level relatively to the amount of oil contained thereon.

10. An oil separator comprising a tank in which the separation takes place, the said tank having a plurality of vertically disposed chambers, and means for adjusting the height of an intermediate chamber for maintaining a predetermined amount of oil on the surface of the fluid at all times and for regulating the water level relative to the amount of oil contained thereon.

In testimony whereof I affix my signature in presence of two witnesses.

HERMAN TEN WINKEL.

Witnesses:
JNO. G. POWELL,
JESSIE F. HOBART.